United States Patent [19]
Buckland et al.

[11] Patent Number: 5,907,552
[45] Date of Patent: May 25, 1999

[54] FTTC INTERFACE CIRCUITRY AS A PHYSICAL LAYER ENTITY

[75] Inventors: Kenneth M. Buckland, Rohnert Park; Thomas R. Eames, Santa Rosa; Lac X. Trinh, Rohnert Park; Steven D. Warwick, Santa Rosa, all of Calif.

[73] Assignee: Next Level Communications, Rohnert Park, Calif.

[21] Appl. No.: 08/706,573

[22] Filed: Sep. 5, 1996

Related U.S. Application Data

[60] Provisional application No. 60/003,464, Sep. 8, 1995.

[51] Int. Cl.$^6$ .................................................. H04L 12/56
[52] U.S. Cl. .......................... 370/399; 370/422; 370/432
[58] Field of Search .................................. 370/235, 236, 370/395, 396, 397, 398, 399, 400, 409, 410, 432, 471, 473, 474, 422, 390; 395/200.52, 200.53, 200.57, 200.61, 200.62, 200.68, 200.75

[56] References Cited

U.S. PATENT DOCUMENTS

| | | | |
|---|---|---|---|
| 4,994,909 | 2/1991 | Graves et al. | 358/86 |
| 5,299,044 | 3/1994 | Mosch et al. | 359/110 |
| 5,325,356 | 6/1994 | Lyles | 370/397 |
| 5,343,475 | 8/1994 | Matsuda et al. | 370/432 |
| 5,363,433 | 11/1994 | Isono | 370/390 |
| 5,414,717 | 5/1995 | Matsumoto et al. | 371/32 |
| 5,425,027 | 6/1995 | Baran | 370/395 |
| 5,430,715 | 7/1995 | Corbalis et al. | 370/392 |
| 5,504,742 | 4/1996 | Kakuma et al. | 370/420 |
| 5,517,617 | 5/1996 | Sathaye et al. | 395/200.52 |
| 5,519,690 | 5/1996 | Suzuka et al. | 370/395 |
| 5,519,698 | 5/1996 | Lyles et al. | 370/411 |
| 5,535,196 | 7/1996 | Aihara et al. | 370/429 |
| 5,583,991 | 12/1996 | Chatwani et al. | 395/200.53 |
| 5,619,498 | 4/1997 | Sharpe et al. | 370/396 |

OTHER PUBLICATIONS

William Stallings, *Networking Standards* (Addison–Wesley, Massachusetts, 1993) p. 287.

*Primary Examiner*—Chi H. Pham
*Assistant Examiner*—Kwang B. Yao
*Attorney, Agent, or Firm*—J.P. Blasko Professional Corp.; John P. Blasko; Charles A. Eldering

[57] ABSTRACT

In an Asynchronous Transfer Mode (ATM) communications network which operates over a shared media a method of addressing and access control between a central transceiver and multiple transceivers in a residence is required. A device identifier is placed in the in the Generic Flow Control (GFC) field of the ATM cells to indicate that cells are designated for a particular transceiver or transceivers in the residence. In the reverse direction, transceivers in the residence use the GFC field to indicate that they are attempting to sign onto the network. The GFC bits are returned to zero prior to passing the ATM cells to the ATM processing layer.

2 Claims, 5 Drawing Sheets

TABLE 1 — GFC Field designations

| GFC Field (binary value) | GFC Field (decimal value) | Device/meaning |
|---|---|---|
| 0000 | 0 | BROADCAST (DOWNSTREAM), SIGN ON (UPSTEAM) |
| 0001 | 1 | CONTENTION ACCESS (UPSTEAM) |
| 0010 | 2 | 2 |
| 0011 | 3 | 3 |
| 0100 | 4 | 4 |
| 0101 | 5 | 5 |
| 0110 | 6 | 6 |
| 0111 | 7 | 7 |
| 1000 | 8 | 8 |
| 1001 | 9 | 9 |
| 1010 | 10 | 10 |
| 1011 | 11 | 11 |
| 1100 | 12 | 12 |
| 1101 | 13 | 13 |
| 1110 | 14 | 14 |
| 1111 | 15 | SPECIAL PURPOSE |

FTTC INTERFACE CIRCUITRY AS A PHYSICAL LAYER ENTITY

CROSS-REFERENCES

This application claims the benefit of U.S. Provisional application No. 60/003,464 filed on Sep. 8, 1995, entitled "FTTC Interface Circuitry as a Physical Layer Entity," of which Kenneth M. Buckland, Thomas R. Eames, Lac X. Trinh and Steven D. Warwick are the inventors, with attorney docket number NP2007.

FIELD OF THE INVENTION

The field of the invention is telecommunications, and more specifically, the use of Asynchronous Transfer Mode (ATM) technology to transport cell based information over a physical medium (layer) in which a single network point connects to multiple devices in a point-to-multipoint configuration.

BACKGROUND OF THE INVENTION

In ATM distribution systems, the physical layer is defined as a functional group comprised of hardware, software and transmission media which converts an ATM cell stream into bits to be transported over the transmission media and supports the transmission and reception of these bits. Examples of transmission media are optical fiber, coaxial cable, free space, and twisted copper pairs. Once the data is transported over the physical layer it is presented to the next layer, the Asynchronous Transmission Mode (ATM) layer. At the output of the device, the data can be presented via a number of interfaces, one of which is the Universal Test & Operations PHY Interface for ATM (UTOPIA) as described by the ATM Forum.

Simultaneously with the development of ATM technology, there have been advances in Fiber-to-the-Curb (FTTC) technology in which devices are connected to the telephone central office via a network of optical fibers connecting the central office to single network points called Broadband Network Units (BNUs) which in turn connect to the subscriber residence via a coaxial cable, and to the devices in the residence via a passive splitter and in-home coaxial wiring. In these FTTC networks, signals can be routed to the residence via a single coaxial cable connecting the residence to the BNU, but the passive network in the home results in information arriving at multiple devices, each which must have the ability to determine which signals are for that particular device. Likewise, when devices transmit from the residence to the BNU the BNU must have a mechanism for determining from which device the information was transmitted from.

When ATM transmission techniques are used, the information is in the form of cells which contain addressing which is known as the Virtual Path Identifier (VPI) and the Virtual Channel Identifier (VCI). The VPI and VCI fields can be read to determine the destination of a particular cell, but when a passive point-to-multipoint network which does not contain switching or routing capabilities is part of the physical layer cells destined for a particular device will arrive at multiple devices. Having the all receiving devices read all of the cells to determine which cells are actually destined for that device from their VPI/VCI values results in an inefficient means of cell discrimination and will require additional cell processing capability at each device. An additional problem arises in that in the reverse direction on the point-to-multipoint network the devices will transmit cells to a single receiving point, and that receiving point will not be able to determine from which originating device the cells were transmitted, without inspection of the VPI/VCI values.

One of the goals of the present invention is to provide one or more embodiments which permit the transport of ATM cells over a point-to-multipoint network, such as those encountered in FTTC.

Another goal of the present invention is to provide one or more embodiments which result in a physical layer in which the transceivers can be implemented in low cost monolithic integrated circuits which provide discrimination of cells such that the physical layer supports cells being transmitted over a point-to-multipoint network without examining the VPI/VCI fields within the cells.

SUMMARY OF THE INVENTION

In an ATM distribution system in which cells are received from an ATM network at a single network point with addressing information contained within the VPI/VCI fields of the cell, bits within a specific field within the cell called the Generic Flow Control (GFC) field are set to correspond to the destination device for that particular cell. The cells can be transmitted across a point-to-multipoint network, such as the coaxial network which exists in a FTTC system, where multiple devices within a residence receive all of the information transmitted to that residence. At the devices in the residence the GFC field is used to determine which cells are destined for that device, without having to examine the VPI/VCI fields within the cells. The GFC bits are subsequently reset to zero before the cells are passed from the device to a user terminal, thus the details of the physical layer are not passed to the ATM layer.

For cells transmitted in the reverse direction, from devices to a single network point over the multipoint-to-point coaxial network, the GFC bits are encoded with information corresponding to the device number of the originating device. When received at the single network point, the originating device can be determined by examination of the GFC bits. This information is useful in monitoring the traffic from devices and determining which devices should be granted permission to transmit on the coaxial network. As in the forward direction, the GFC bits can be reset to zero when information is passed back to the ATM layer so that the details of the physical layer are hidden from that (ATM) layer.

DESCRIPTION OF THE PREFERRED EMBODIMENT OR EMBODIMENTS

Figure 1:
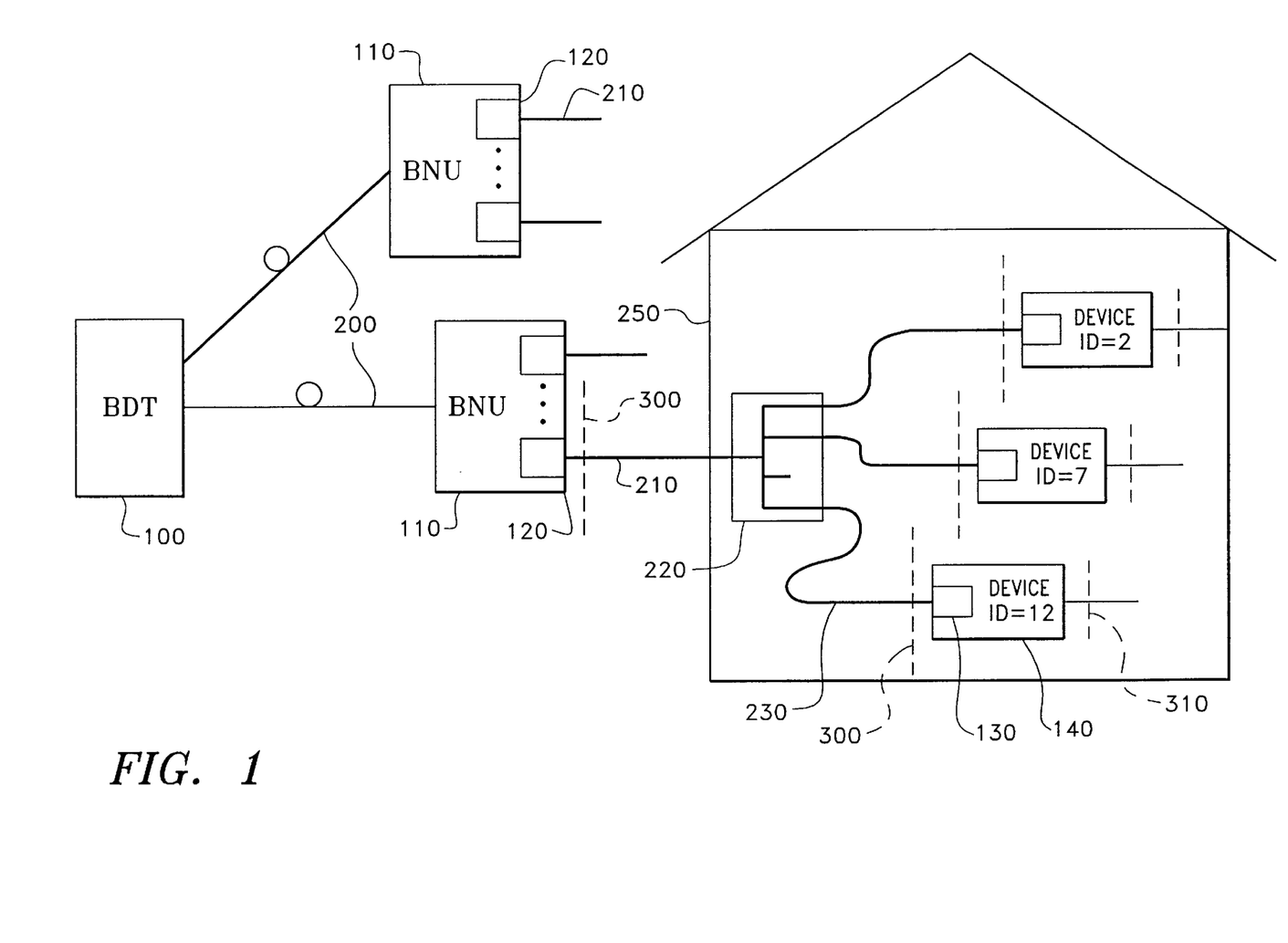
FIG. 1 shows a Fiber-to-the-Curb network with a point-to-multipoint coaxial network connecting the Broadband Network Unit (BNU) with devices in the residence.

FIG. 1 illustrates a Fiber-to-the-Curb (FTTC) network which delivers telecommunications services to a residence (250). Services are provided in the FTTC network shown in FIG. 1 via a Broadband Digital Terminal (100) which is connected to a Broadband Network Unit (110) via an optical fiber (200). The connection to the residence (250) is made by a BNU physical layer transceiver (120) which is connected by a coaxial drop cable (210) to a splitter (220) which is connected to one or more devices (140) via in-home coaxial cable (230). Each device contains a device physical layer transceiver (130). The relevant interfaces for this network are illustrated in FIG. 1 and are the UNI interface (300) on the coaxial cable and the UTOPIA interface (310) at the output of the device. The User Network Interface (UNI) is a specification which covers the parameters of the interface from the physical layer to the ATM layer.

Figure 2:
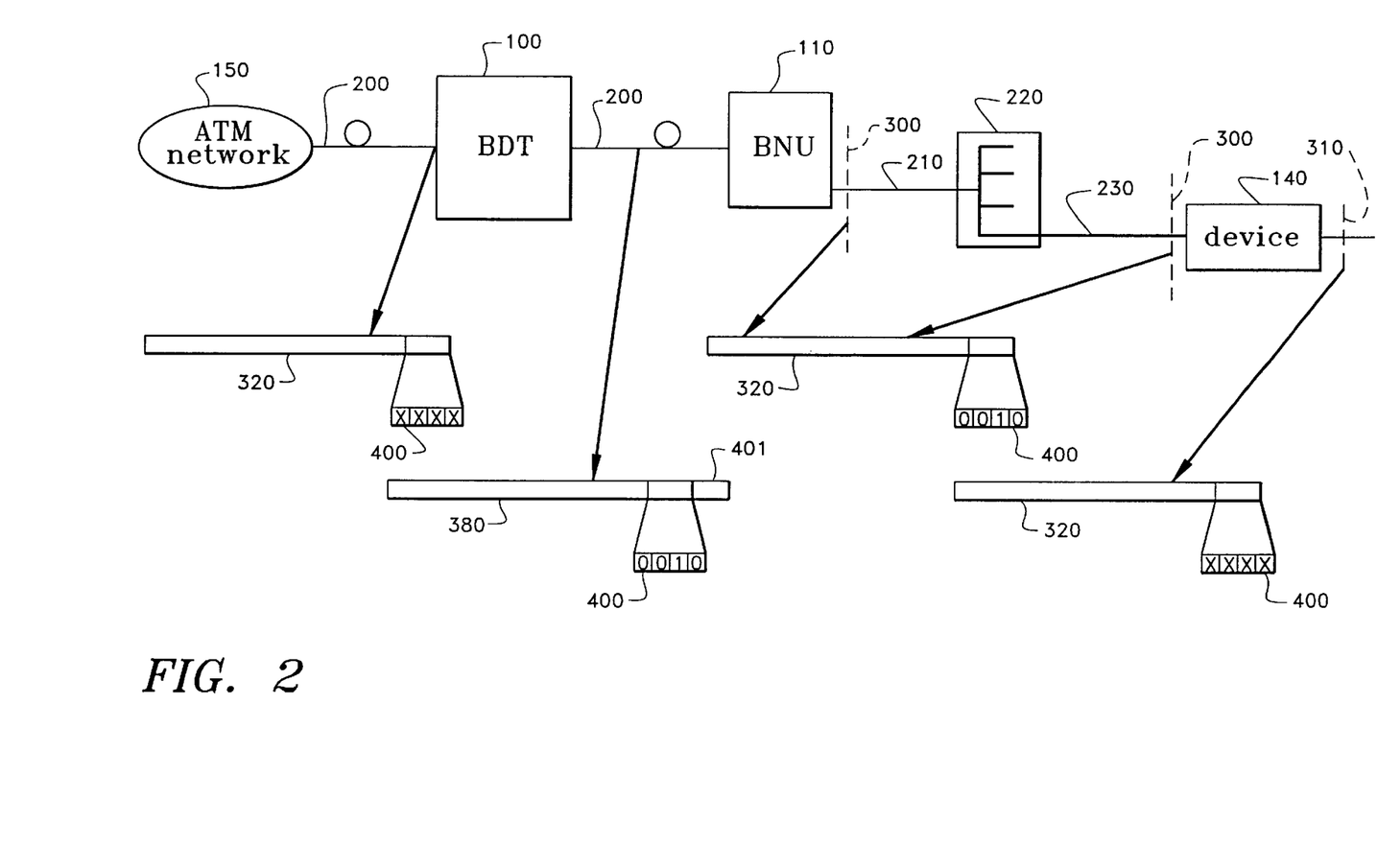
FIG. 2 shows a FTTC network connected to an ATM network with devices at the end of the FTTC network.

FIG. 2 illustrates an FTTC network and is identical to that shown in FIG. 1 with additional representation of the status of ATM cells (320), prepended ATM cells, (380) and the Generic Flow Control fields (400) within the cells as the cells pass through the network. Cells enter the FTTC system in FIG. 2 from an external ATM network (150) via an optical fiber (200) which interconnects the ATM network with the Broadband Digital Terminal, BDT (100). An optical fiber connects the Broadband Digital Terminal, BDT (100) to the Broadband Network Unit (110) which connects to a splitter (220) via a coaxial drop cable (210). The splitter is connected to a device (140) via an in-home coaxial cable (230). The FTTC network shown in FIG. 2, and the UNI interfaces (300) and UTOPIA interface (310) shown in FIG. 2 are the same as those shown in FIG. 1.

Figure 3:
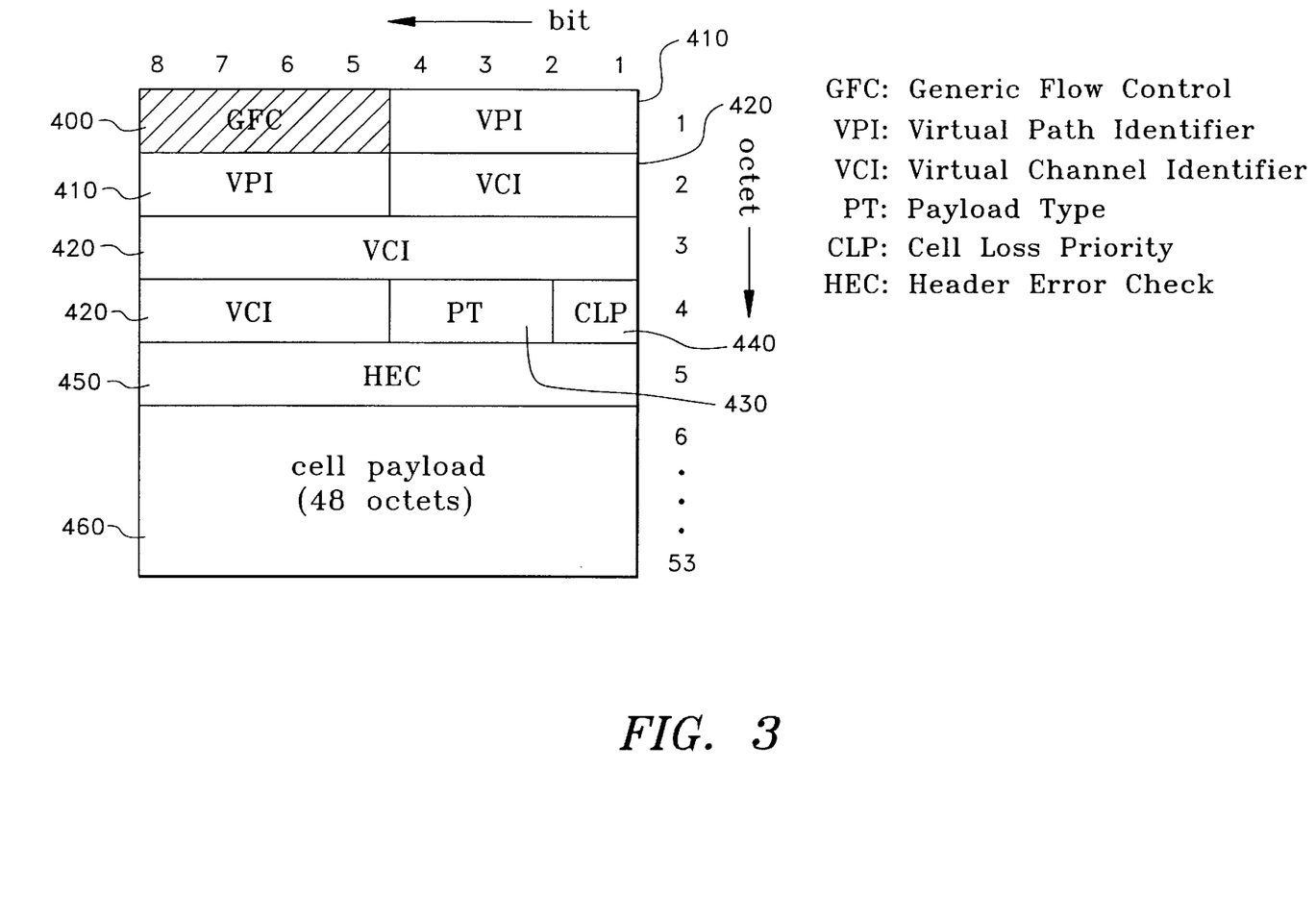
FIG. 3 shows an ATM cell and the fields within the cell.

The content of an ATM cell (320) as shown in FIG. 2 is further illustrated in FIG. 3 where a 53 octet ATM cell is shown and the fields defined: the Generic Flow Control field (400), the Virtual Path Identifier field (410), the Virtual Channel Identifier (420), the Payload Type field (430), the Cell Loss Priority field (440), the Header Error Check field (450) and the cell payload (460).

A first embodiment of the invention is the FTTC network shown in FIGS. 1 and 2 in which ATM cells (320) shown in FIG. 3 enter the Broadband Digital Terminal, BDT (100), and the Generic Flow Control field (400) of the ATM cells (320) is undefined. The actual bits may be set to zero but the content of the field is not relevant to this embodiment at this stage. At the Broadband Digital Terminal (100) the bits in the Generic Flow Control field (400) are set to an device number which corresponds to the device number of the destination device (140). In addition, a prepend field (401) is added to the ATM cell to form a prepended ATM cell (380). The prepend field (401) is used for routing the cell from the BDT to the appropriate BNU physical layer transceiver (120). This prepend information and Generic Flow Control field information can be determined from the address information contained within the Virtual Path Identifier field (410) and Virtual Channel Identifier field (420) in the ATM cell (320). As shown in FIG. 2, cells leaving the Broadband Digital Terminal, BDT (100) have the Generic Flow Control field (400) set to correspond to the device number of the destination device. The cells are received by the Broadband Network Unit, BNU (110) and are transmitted over the point-to-multipoint coaxial network comprised of coaxial drop cable (210), a splitter (220) and in-home coaxial cable (230). The cells passing from the Broadband Network Unit, BNU (110) over the UNI interface (300) have the Generic Flow Control field (400) set to indicate the device number of the destination device. Since multiple devices can be connected to the coaxial network, the Generic Flow Control field (400) is used by the device to determine which cells are destined for that particular device. An important advantage of this embodiment is that it is not necessary to examine the Virtual Channel Identifier field (420) or the Virtual Path Identifier field (410) to determine if the cells are destined for that device. Using the Generic Flow Control field for addressing in a point-to-multipoint environment results in physical layer discrimination of the cells as opposed to ATM layer discrimination of cells. The UNI interface specification is adhered to at both the exit of the Broadband Network Unit, BNU (300) and at the device (140) input, since there are no additional fields added to the ATM cell. At the output of the device (140) cells can be presented to subscriber equipment using a UTOPIA interface (310), with the Generic Flow Control field (400) bits set to zero, since the cells have arrived at the FTTC network termination point. It should be additionally noted than a UTOPIA interface may exist inside the Broadband Network Unit, BNU (300) or the Broadband Digital Terminal (100).

In this first embodiment cells are transmitted in the reverse direction (from devices to a BNU) using a similar addressing scheme to that used in the forward (BNU to device) direction in which the device number of the device is encoded in the Generic Flow Control field of the ATM cell. Although all cells arrive at the BNU it is useful to determine from which device the cells originated. Information with respect to the origination of the cells can be used by the BDT as well, but is removed before transmission of the cells to the ATM network. An alternate method, in which the BNU keeps track of which device it has granted transmission authorization to and correlates the arrival of each cell with the grant is possible but much more complex. If the origination device number is not required at the ATM layer, the Generic Flow Control field bits can be returned to zero for transmission to that layer.

Figure 4:
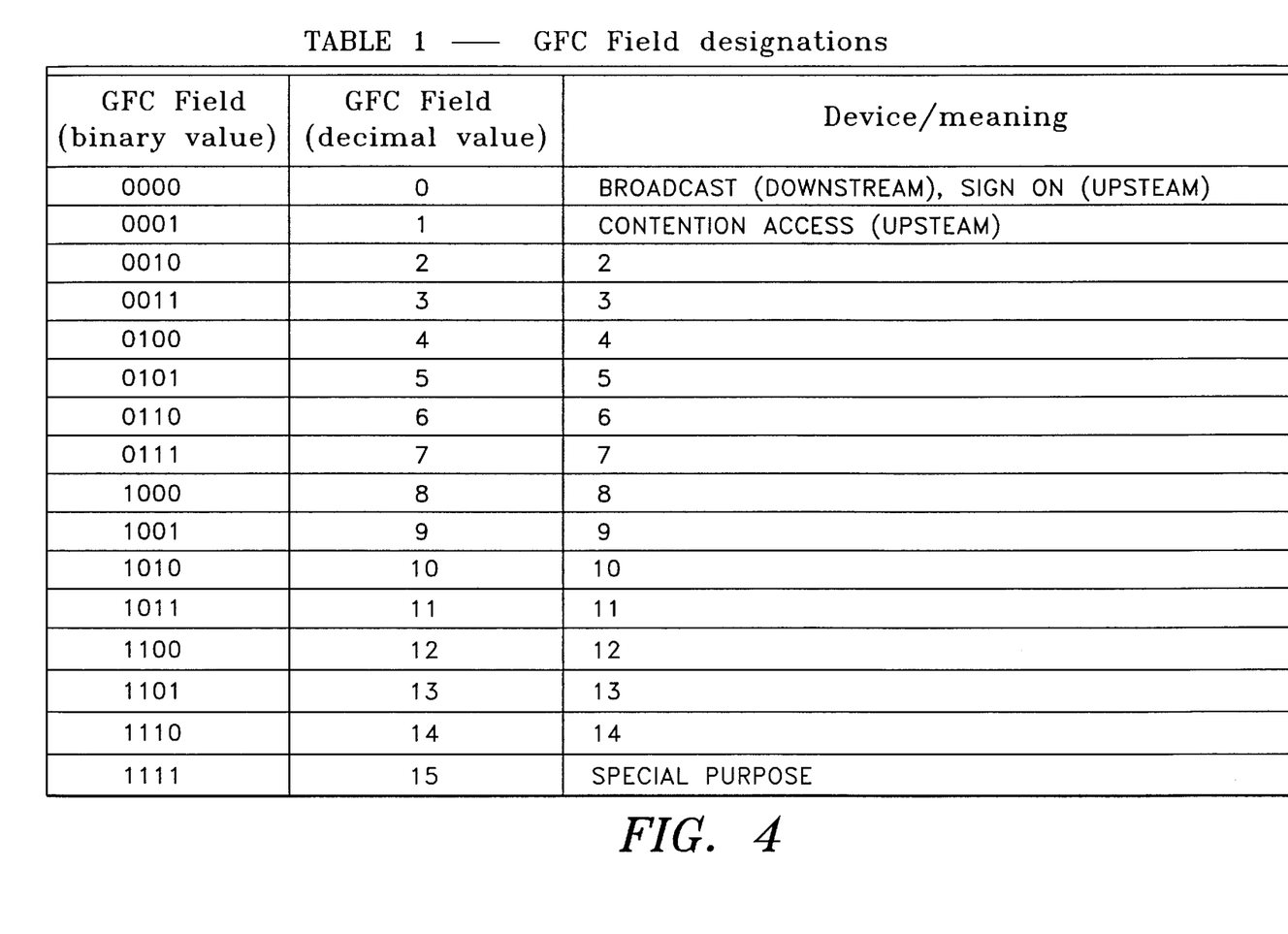
FIG. 4 illustrates a table of GFC field designations.

FIG. 4 shows one possible addressing scheme which can be employed in the first embodiment and which gives meaning to each of the possible values for all of the combinations of the four bits in the Generic Flow Control field. From this table it can be seen that in both the downstream and upstream directions the decimal values of 2–14 in the Generic Flow Control field correspond to the device numbers of the devices. In the downstream direction, an all zeros designation (decimal zero in the Generic Flow Control field) in the Generic Flow Control field indicates that the cell is intended for broadcast to all devices, while in the upstream the all zeros designation indicates that a device is attempting to sign onto the network and has not yet received a device number. The decimal value of 15 is reserved for special purposes.

Figure 5:
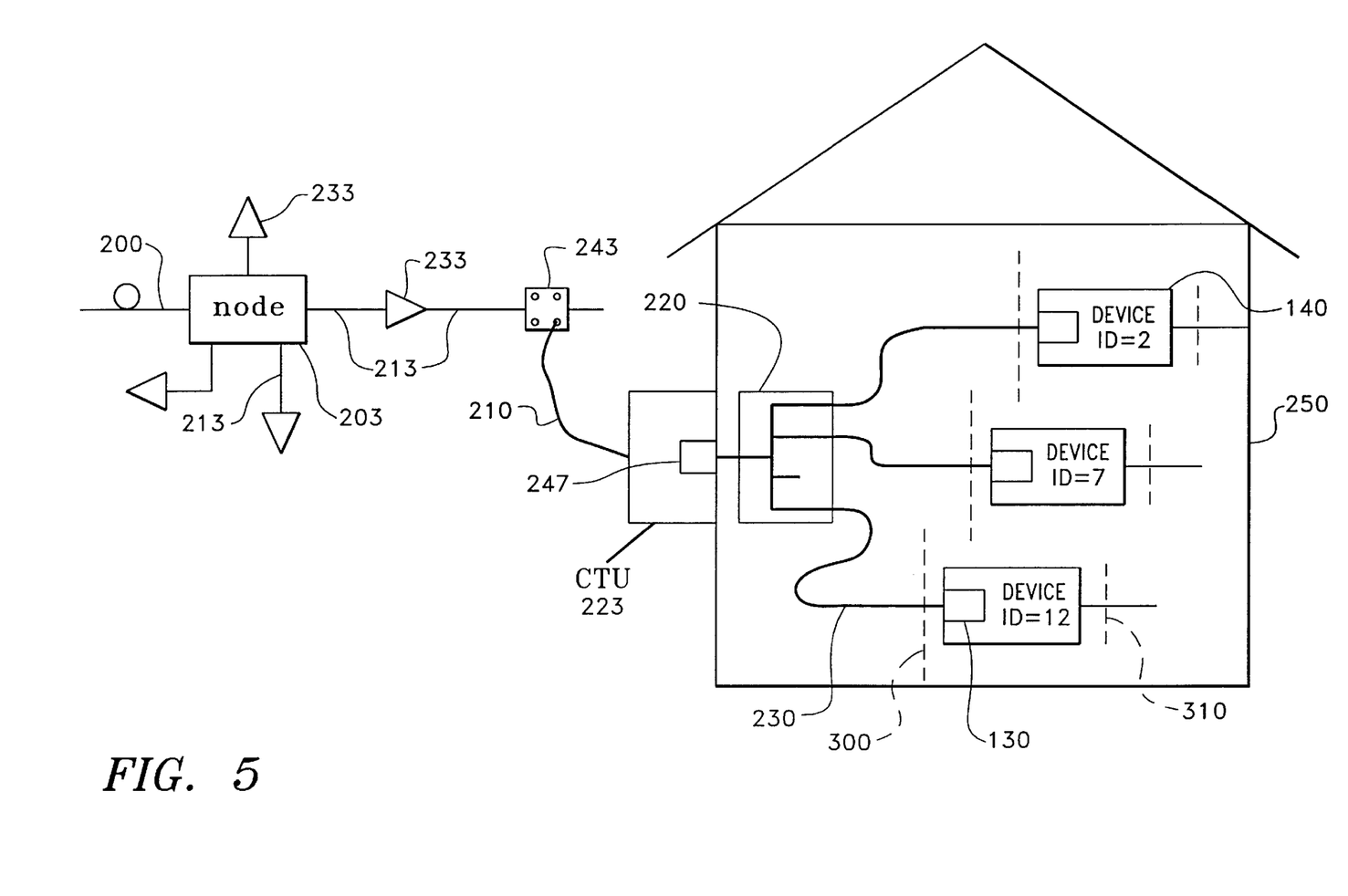
FIG. 5 shows a hybrid fiber-coaxial network with a point-to-multipoint coaxial network connecting a Coaxial Termination Unit (CTU) with devices in the residence.

An second embodiment is to use a hybrid fiber-coaxial network such as the one shown in FIG. 5, in which signals are transmitted in a sub-carrier division multiplexed form from a cable head-end to and from a node (203) via an optical fiber. Signals from the node (203) are transported to the residence (250) via a network of coaxial feeder cable (213), amplifiers (233), taps (243) and coaxial drop cable (210) which connects to a coaxial termination unit (223) at the side of the home which contains modems for receiving and transmitting data to and from the head-end. The coaxial termination unit also contains a coaxial termination unit physical layer transceiver (247) for transmitting to and receiving from devices (140) within the residence via a splitter (220) and in-home coaxial cable (230). There exists a UNI interface (300) at the exit of the coaxial termination unit (223) and at the entrance to the device (130). A UTOPIA interface (310) exists at the output of the devices.

In the second embodiment shown in FIG. 5 the point-to-multipoint network exists between the coaxial termination unit and the devices in a similar fashion to the point-to-multipoint network which existed between the BNU and the devices. As in the first embodiment, the Generic Flow Control field is used to indicate the device number of the device for transmission to that device, and reception from that device on the point-to-multipoint coaxial network. The addressing scheme shown in FIG. 4 can be used in the second embodiment.

A means of realizing the first embodiment on a FTTC network such as the one shown in FIG. 1 is to utilize a BDT which receives SONET type signals containing ATM cells from an ATM network cells on an optical fiber using an OC-3c transmission rate at 155.52 Mb/s. Within the BDT information in the Virtual Path Identifier field and Virtual Channel Identifier field of the cells is examined to determine the destination device for that cell. The information for the prepend field is calculated from the VPI/VCI fields and the prepend is added to the ATM cell to route the cell to the appropriate BNU physical layer transceiver and corresponding coaxial drop cable. The bits in the Generic Flow Control field are set to the appropriate device number to correspond to the destination device. The table shown in FIG. 4 can be utilized to realize this embodiment.

In this embodiment cells are sent from the BDT to the BNU on an optical fiber using a 155.52 Mb/s data rate which has a formatting which is similar but not identical to SONET. The cells are transmitted to the residence from the BNU over the coaxial network using a Quadrature Phase Shift Keying (QPSK) modulation technique which carries data at 51.84 Mb/s on a 622.08 MHz carrier. At the devices, the Generic Flow Control field is used to determine if a particular cell should be processed by that device and passed to the UTOPIA interface or if it should be discarded. Broadcast cells, recognized by an all zero GFC field, are processed by all devices. Traditional digital logic can be used to perform the discrimination function. When passed to the UTOPIA interface the Generic Flow Control field is set to zero. This function can also be accomplished using digital logic.

In the reverse direction, cells are transmitted upstream from the devices to the BNU over the coaxial network at an aggregate data rate of 19.44 Mb/s on a 29.16 MHz carrier. QPSK modulation is also used in the upstream direction, and a Time Division Multiple Access (TDMA) technique is used to multiplex the cells from the various devices. The Generic Flow Control field is used to identify from which device the cell was transmitted.

An application for the best mode of the invention is the transport of switched digital video over a FTTC network to one or more devices in a residence. The devices (140) can be part of a television set-top which provides digital to analog conversion and allows the user to send signals back up the network to request different channels or services. In this application the Generic Flow Control field is used in the downstream to enable the devices to easily discriminate cells which contain video for that television set-top. In the reverse direction the Generic Flow Control field is used to identify from which television set-top in that residence the signal originated.

A first advantage of the present invention is that the physical layer circuitry can be implemented in a monolithic silicon integrated circuit. The physical layer circuitry in the BNU physical layer transceiver may be different from that in the device physical layer transceiver, but it is possible to develop two integrated circuits, one of which is used in all of the BNU physical layer transceivers and another which is the same for all device physical layer transceivers.

A second advantage is that standard ATM integrated circuits can be used for the ATM layer processing, since no additional fields are added to the ATM cells to route them to the devices.

A third advantage is that the FTTC network can be viewed as a physical layer which presents standard UNI and UTOPIA interfaces to the ATM layer. No translations from the ATM layer to a special or proprietary physical layer are necessary, since the use of the Generic Flow Control field for device addressing is contained within the FTTC physical layer.

Although the present invention has been described in considerable detail with reference to certain preferred versions thereof, other versions are possible. The goal of the invention as a method and apparatus for realizing interface circuitry as a physical layer which utilizes the HFC bits in an ATM cell to distinguish devices and cell function with different functions for the downstream and the upstream remains the same. Therefore the spirit and scope of the appended claims should not be limited to the description of the preferred versions contained herein.

We claim:

1. In a fiber to the curb communications system having a first terminal connected to a broadband telecommunications network, a set of remotely located second terminals connected to said first terminal via multiple fiber optic transmission links, a group of subscriber terminals in a residence, wherein said group of subscriber terminals are connected to an individual remotely located second terminal of said set of remotely located second terminals via a shared medium, a method of addressing Asynchronous Transfer Mode (ATM) cells for an individual subscriber terminal in said residence, said method comprising the steps of;

a) receiving said Asynchronous Transfer Mode (ATM) cells from said broadband telecommunications network at said first terminal wherein said Asynchronous Transfer Mode (ATM) cells contain routing information in a Virtual Path Identifier (VPI) field and a Virtual Channel Identifier (VCI) field;

b) generating a four-bit binary code which corresponds to an address of said individual subscriber terminal in said group of subscriber terminals when, based on routing information stored within said first terminal, said Virtual Path Identifier (VPI) field and said Virtual Channel Identifier (VCI) field indicate that said Asynchronous Transfer Mode (ATM) cells are to be ultimately received by said individual subscriber terminal;

c) inserting said four-bit binary code in a four-bit Generic Flow Control (GFC) field of said Asynchronous Transfer Mode (ATM) cells wherein said four-bit binary code corresponds to said address of said individual subscriber terminal;

d) routing said Asynchronous Transfer Mode (ATM) cells from said first terminal to said individual remotely located second terminal wherein routing from said first terminal to said individual remotely located second terminal is accomplished based on information contained within said Virtual Path Identifier (VPI) field and said Virtual Channel Identifier (VCI) field of said Asynchronous Transfer Mode (ATM) cells;

e) transmitting said Asynchronous Transfer Mode (ATM) cells over a fiber optic transmission link to said individual remotely located second terminal;

f) receiving said Asynchronous Transfer Mode (ATM) cells at said individual remotely located second terminal;

g) routing said Asynchronous Transfer Mode (ATM) cells to said group of subscriber terminals, wherein said routing is accomplished based on information contained within said Virtual Path Identifier (VPI) field and said Virtual Channel Identifier (VCI) field of said Asynchronous Transfer Mode (ATM) cells;

h) transmitting said Asynchronous Transfer Mode (ATM) cells to said group of subscriber terminals over said shared medium;

i) receiving said Asynchronous Transfer Mode (ATM) cells at said group of subscriber terminals; and j) accepting said Asynchronous Transfer Mode (ATM) cells at said individual subscriber terminal when said four-bit binary code in said four-bit Generic Flow Control (GFC) field of said Asynchronous Transfer Mode (ATM) cells corresponds to said address of said individual subscriber terminal.

2. In a fiber to the curb communications system having a first terminal connected to a broadband telecommunications network, a set of remotely located second terminals connected to said first terminal via multiple fiber optic transmission links, a group of subscriber terminals in a residence, wherein said group of subscriber terminals are connected to an individual remotely located second terminal of said set of remotely located second terminals via a shared medium, a method of multicasting Asynchronous Transfer Mode (ATM) cells to said group of subscriber terminals in said residence, said method comprising the steps of;

a) receiving said Asynchronous Transfer Mode (ATM) cells from said broadband telecommunications network at said first terminal wherein said Asynchronous Transfer Mode (ATM) cells contain routing information in a Virtual Path Identifier (VPI) field and a Virtual Channel Identifier (VCI) field;

b) generating a four-bit binary code which corresponds to a unique number which does not correspond to an address of an individual subscriber terminal in said group of subscriber terminals when, based on routing information stored within said first terminal, said Virtual Path Identifier (VPI) field and said Virtual Channel Identifier (VCI) field indicate that said Asynchronous Transfer Mode (ATM) cells are to be ultimately received by said group of subscriber terminals;

c) inserting said four-bit binary code in a four-bit Generic Flow Control (GFC) field of said Asynchronous Transfer Mode (ATM) cells;

d) routing said Asynchronous Transfer Mode (ATM) cells from said first terminal to said individual remotely located second terminal wherein routing from said first terminal to said individual remotely located second terminal is accomplished based on information contained within said Virtual Path Identifier (VPI) field and said Virtual Channel Identifier (VCI) field of said Asynchronous Transfer Mode (ATM) cells;

e) transmitting said Asynchronous Transfer Mode (ATM) cells over a fiber optic transmission link to said individual remotely located second terminal;

f) receiving said Asynchronous Transfer Mode (ATM) cells at said individual remotely located second terminal;

g) routing said Asynchronous Transfer Mode (ATM) cells to said group of subscriber terminals, wherein said routing is accomplished based on information contained within said Virtual Path Identifier (VPI) field and said Virtual Channel Identifier (VCI) field of said Asynchronous Transfer Mode (ATM) cells;

h) transmitting said Asynchronous Transfer Mode (ATM) cells to said group of subscriber terminals over said shared medium;

i) receiving said Asynchronous Transfer Mode (ATM) cells at said group of subscriber terminals; and j) accepting said Asynchronous Transfer Mode (ATM) cells at said group of subscriber terminals when said four-bit binary code in said four-bit Generic Flow Control (GFC) field of said Asynchronous Transfer Mode (ATM) cells corresponds to said unique code indicating that said Asynchronous Transfer Mode (ATM) cells are to be received by said group of subscriber terminals.

* * * * *

UNITED STATES PATENT AND TRADEMARK OFFICE

CERTIFICATE OF CORRECTION

Patent No.    :  5,907,552
Dated         :  May 25, 1999
Inventor(s)   :  Kenneth M. Buckland; Thomas R. Eames; Lac X. Trinh; and Steven D. Warwick.

It is certified that error appears in the above-identified patent and that said Letters Patent is hereby corrected as shown below:

Col. 6, line 12 change "HFC" to --GFC--.

Signed and Sealed this

Twelfth Day of December, 2000

Attest:

Q. TODD DICKINSON

Attesting Officer

Director of Patents and Trademarks